United States Patent
Noldus et al.

(10) Patent No.: US 8,208,940 B2
(45) Date of Patent: Jun. 26, 2012

(54) METHOD AND A SYSTEM FOR ESTABLISHING PRESENCE OF A MOBILE STATION IN AT LEAST ONE DEDICATED SERVICE AREA OF A MOBILE TELECOMMUNICATIONS SYSTEM

(75) Inventors: Rogier Noldus, Goirle (NL); Jos den Hartog, Capelle a/d Ijssel (NL); Rakesh Taori, Youngtongdong (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 523 days.

(21) Appl. No.: 12/095,712

(22) PCT Filed: Oct. 31, 2005

(86) PCT No.: PCT/EP2005/011713
§ 371 (c)(1),
(2), (4) Date: Nov. 18, 2009

(87) PCT Pub. No.: WO2007/051482
PCT Pub. Date: May 10, 2007

(65) Prior Publication Data
US 2010/0167725 A1    Jul. 1, 2010

(51) Int. Cl.
*H04W 8/04* (2009.01)
*H04W 8/02* (2009.01)
(52) U.S. Cl. .................... 455/456.1; 455/435.1; 455/433
(58) Field of Classification Search .................. 455/456, 455/433, 435.1
See application file for complete search history.

(56) References Cited

U.S. PATENT DOCUMENTS

| 6,101,387 | A  | * | 8/2000 | Granberg et al. | 455/433 |
| 6,516,193 | B1 | * | 2/2003 | Salmela et al. | 455/432.3 |
| 2002/0032032 | A1 | | 3/2002 | Haumont et al. | |
| 2003/0186710 | A1 | | 10/2003 | Muhonen et al. | |
| 2004/0002897 | A1 | * | 1/2004 | Vishik | 705/14 |
| 2004/0157620 | A1 | * | 8/2004 | Nyu | 455/456.1 |
| 2004/0180674 | A1 | | 9/2004 | Blomqvist et al. | |
| 2004/0266453 | A1 | | 12/2004 | Maanoja et al. | |
| 2006/0014531 | A1 | * | 1/2006 | Nam et al. | 455/418 |

FOREIGN PATENT DOCUMENTS

JP    2002-218554 A    8/2002

* cited by examiner

*Primary Examiner* — Marivelisse Santiago Cordero
*Assistant Examiner* — Jean Chang

(57) ABSTRACT

A method of and a system for establishing presence of a mobile station in at least one dedicated service area of a mobile telecommunications system providing service to a plurality of geographically spread service areas. A mobile station is triggered to provide location information relating to the presence of the mobile station at a location receiving service from a service area comprising the or each dedicated service area. Presence of the mobile station in the or each dedicated service area is established by comparing the location information provided by the mobile station and stored location information relating to the or each dedicated service area. If present in a dedicated service area, the mobile station automatically receives dedicated services to which the mobile unit is entitled to. Receipt of dedicated services is automatically indicated to a user of the mobile station.

14 Claims, 9 Drawing Sheets

* = Indexed fields

METHOD AND A SYSTEM FOR ESTABLISHING PRESENCE OF A MOBILE STATION IN AT LEAST ONE DEDICATED SERVICE AREA OF A MOBILE TELECOMMUNICATIONS SYSTEM

FIELD OF THE INVENTION

The present invention relates generally to mobile telecommunications systems, comprising mobile communication terminals and a radio network infrastructure, fixed communication terminals, application nodes and a transport network. More particularly, the present invention facilitates a method and a system for establishing presence of a mobile station in at least one dedicated service area, delivering information to users of mobile communication terminals receiving service from a dedicated service area, and services and facilities provided by the communications system in a dedicated service area.

BACKGROUND OF THE INVENTION

State of the art communications systems comprise a multitude of communication terminals and nodes connected by an interconnecting network. The communications systems provide facilities and services to users of the communications systems via their communication terminals.

Current communication terminals may have a plurality of physical access possibilities to the interconnecting network via access points. Physical access can be based on a radio link using a radio frequency part of the electromagnetic spectrum such as generally known under the acronyms WLAN, GSM, GPRS, UMTS, DECT, or Bluetooth, or utilise another part of the electromagnetic spectrum like infrared ports and others. These types of access are commonly identified as wireless or cellular access. Further, fixed line connections may form part of a communications system, utilising electrical, optical or equivalent means for transportation of information. These are generally known under the acronyms like ADSL, SDSL, cable-modem, LAN, ISDN or regular PSTN, and others, and are commonly identified as wire-line access.

Communication terminals having only wireless connection as physical access are identified as mobile terminals.

In addition to the physical access, a terminal may have a plurality of functional access possibilities towards facilities and services provided by a communications system, such as but not limited to switched voice call, IP based voice call, SMS, MMS, Internet browsing, and e-mail.

The communications system further comprises administration, charging and executing functions. The executing functions actually provide the facilities and services of the communications system. The administration functions register various items such as subscription of users to services and facilities, connection state of a functional and physical access of a user terminal, allowable quota for facilities and services, user authentication, terminal authentication, and passwords. The charging functions in the communications system register the actual usage of facilities and services, translate actual usage into amounts to be charged and forward charging information to billing systems inside or outside the communication network.

State of the art communications systems comprise multiple parties, which offer services and facilities to users of the communications system. These parties will further be identified as Providers. Providers deliver competing services and facilities.

When a wireless communication network is spread over a larger geographic area it is identified as PLMN (Public Land Mobile Network). Examples of PLMNs are GSM, GPRS, and UMTS. The mobile terminal having access via the PLMN is commonly identified as MS (Mobile Station).

For purposes of handling a multitude of Mobile Stations, a PLMN is geographically divided in one or more VLR-SA (Visitor Location Register "VLR"—Service Area "SA"). Typically, a VLR-SA may, in turn, comprise one or more LSA (Location Service Area). The division in VLR-SA is valid for all users (Mobile Stations). The LSA may only provide different access rights to a user. In general, a service area is subdivided into a plurality of smaller geographical areas, called service cells.

A user may also have a subscription to specific or dedicated geographical or service areas, generally identified as zones. A zone provides the possibility of providing dedicated services to a user and/or to adept execution of services and facilities or charging of them, for example, tailored to a specific user or group of users, for example. A zone may comprise one or more cells of the PLMN and a zone may reside inside an LSA. Examples of a zone of a user are called home zone and office zone. A home zone comprises a cell or cells of the PLMN covering the residential home of the user, and an office zone comprises one or more cells covering the area of the place of business of the user. Also temporarily zones may be established, such as for a festival or major sport events and the like.

Zones offer providers possibilities to distinguish themselves in offering of services and facilities as well as pricing thereof, for example.

The concept of dedicated service areas or zones is generally known in the state of the art, as well as implementations of the zone concept. A major drawback of the existing systems and methods is, however, that a plurality of services and facilities each separately keep track of mobile stations for establishing whether a mobile station is present in a zone and providing the corresponding dedicated services.

Therefore, there is a need to frequently interrogate administrative functions or nodes in the communication system. This provides an extreme and undue load on these administrative functions or nodes, like a HLR (Home Location Register).

SUMMARY OF THE INVENTION

In a first aspect thereof, the present invention has for its object to provide an improved method for establishing whether a mobile station is present in a dedicated service area or zone of a mobile communications system, not posing an undue load on existing administrative functions or nodes of a mobile communications system.

In a second aspect thereof, the present invention has for its object to provide a method for indicating whether a mobile station receives service from a dedicated service area.

In a third aspect thereof, the present invention relates to a system and mobile station for implementing and use of the method according to the present invention.

According to the first aspect of the present invention, there is provided a method of establishing presence of a mobile station in at least one dedicated service area of a mobile telecommunications system providing service to a plurality of geographically spread service areas, the method comprising the steps of:

a) determining whether the mobile station receives service from a telecommunications systems providing service to the or each dedicated service area;

b) determining whether the mobile station receives service from a service area comprising the or each dedicated service area and, in the affirmative, c) triggering the mobile station to provide location information relating to the presence of the mobile station at a location receiving service from the service area comprising the or each dedicated service area, and d) establishing presence of the mobile station in the or each dedicated service area by comparing the location information provided by the mobile station and stored location information relating to the or each dedicated service area.

The method according to the invention prevents flooding of a network administrative function or node, such as an HLR, by location interrogation request for establishing the presence of a mobile station, by providing location information by a mobile station if and only if the mobile station receives service from a service area comprising a dedicated service area. The method according to the invention applies adaptive mobility management granularity, such that location information is provided if there is a real possibility that a mobile station may enter a dedicated service area or zone. Because the location information is provided by a mobile station, the method according to the invention is very flexible to implement in plurality of services operated internally or externally of a mobile communications system, such as, but not limited to a Virtual Private Network (VPN) service provided by a network operator or service provider.

In a preferred embodiment of the present invention, wherein a service area comprises a plurality of geographically spread service cells, the mobile station provides the location information at receiving service from another cell. To prevent an undue signalling load, the location information is only provided when a mobile station crosses cell borders. As will be known to those skilled in the art, cell identity information is available to a mobile station during operation thereof, which cell identity information is advantageously used to establish whether service to the mobile station is changed from one cell to another.

In the event that a mobile station does no longer receives service from a service area comprising a dedicated service area, in accordance with a further embodiment of the invention, the mobile station is triggered to stop providing location information. In such a case, the above-mentioned steps a)-d) are performed, so to say, in a reverse manner.

If a mobile station is present in a dedicated service area and receives service from a mobile communication system arranged for providing service to such a dedicated service area, at least one dedicated service to which the mobile station is entitled to or has subscribed to is provided automatically by the mobile communication system.

The or each dedicated service may be dedicated to at least one of a group comprising a particular mobile station, a particular group of mobile stations, and at least one dedicated service area. That is, a particular service or services may be provided to a group of mobile stations in an office zone, to a mobile station of a single subscriber in a home zone, or in a temporary service area providing service to a particular event, for example.

In a preferred embodiment of the present invention, if the mobile station is present in the or each dedicated service area and the mobile station is receiving service from a mobile telecommunications system not arranged for providing the or each dedicated service to the mobile station, the mobile station is enforced to receive service from the mobile telecommunications system arranged for providing the or each dedicated service to the mobile station. With this so-called zone enforcement feature of the present invention, a mobile station always receives dedicated services in a dedicated service area, independent whether the mobile station enters the or each dedicated service area from a mobile system arranged for providing dedicated services to such a dedicated service area or service areas.

In practice, a dedicated service area is assigned to a mobile station, whether or not on a subscription basis, using an identification of the mobile station.

In a preferred embodiment of the present invention, a dedicated service area is assigned to a unique Identification of a Mobile Station Identity (IMSI), which mobile station identity is provided by the mobile station together with the location information. The IMSI is located on a Subscriber Identity Mobile (SIM) forming a removable part of the mobile station.

In a further embodiment of the method according to the invention, receipt of service from a service area comprising the or each dedicated service is determined from registration of the mobile station with an administrative function, such as a visitor location register of a mobile telecommunications system.

In general, a mobile station is subscribed to a particular mobile communication system, called the home communication system. Whether the mobile station is present in a service area to which the home system provides service or in another visiting communication system is registered by an administrative function in the home system, also generally called the Home Location Register (HLR).

Accordingly, in a yet further embodiment of the invention, receipt of service from a telecommunications system providing service to the or each dedicated service area is determined from registration of the mobile station with an administrative function, such as a home location register of a mobile telecommunications system.

According to the second aspect of the present invention, presence of a mobile station in the or each dedicated service area is indicated to a user of the mobile station. Such indication preferably comprises at least one of a group including:

display of a dedicated mobile telecommunications system name on a display of the mobile station;

display of a dedicated icon on a display of the mobile station; and providing a dedicated audio alert by the mobile station.

The audio alert, for example, may be different for different dedicated services provided, such as a special audio alert for calls the answering of which is free of charge to the user.

In accordance with the third aspect of the present invention, there is provided a system for establishing presence of a mobile station in at least one dedicated service area of a mobile telecommunications system providing service to a plurality of geographically spread service areas, the system comprises processing means operatively connected to:

database means for storing location information defining the or each dedicated service area;

means for exchanging location, identity and command information with the mobile station;

means for exchanging administrative information, such as a home location register, of a mobile telecommunications system, wherein the processing means are arranged for operating in accordance with the method of the present invention disclosed above.

The processing means may reside internally and/or externally of a mobile communications system, in the latter case, for example, in a suitably programmed zone server.

Preferably, in a further embodiment of the system of the invention, the processing means operatively connect to means for exchanging administrative information, such as a home location register, of a plurality of mobile telecommunications systems. With this embodiment, zone enforcement can be very easily implemented, because the processing means or zone server may directly communicate with the administrative functions for registering a mobile station with an appropriate administrative function for receiving dedicated services if the mobile station is present in a dedicated service area but not receiving service from a mobile communication system arranged for providing dedicated services to the mobile station, such as the HLR.

In a yet further embodiment of the invention the processing means operatively connect to facility and services executing means for establishing presence of a mobile station in the or each dedicated service area specified by a unique identification of a mobile station identity. The facility and connect services may be arranged, among others, for query the zone server for actual presence in a zone or presence in any zone of a specific mobile station specified by its IMSI. Additionally they can start or stop a subscription to changes in the presence state of a specific combination of zone, PLMN and IMSI.

For management and control purposes, in a further embodiment of the invention, the processing means or zone server has also a connection to a terminal for editing, deleting or creating new zone records in the zone database, for example.

The invention further relates to a mobile station for use in a method and system as disclosed above, the mobile station comprising means for providing location information.

The invention will now be described by way of example in a more detailed manner, with reference to the enclosed drawings.

DETAILED DESCRIPTION

Without any limitation, the invention will now be explained with reference to an exemplary embodiment thereof in a cellular mobile telecommunications environment.

Figure 1:
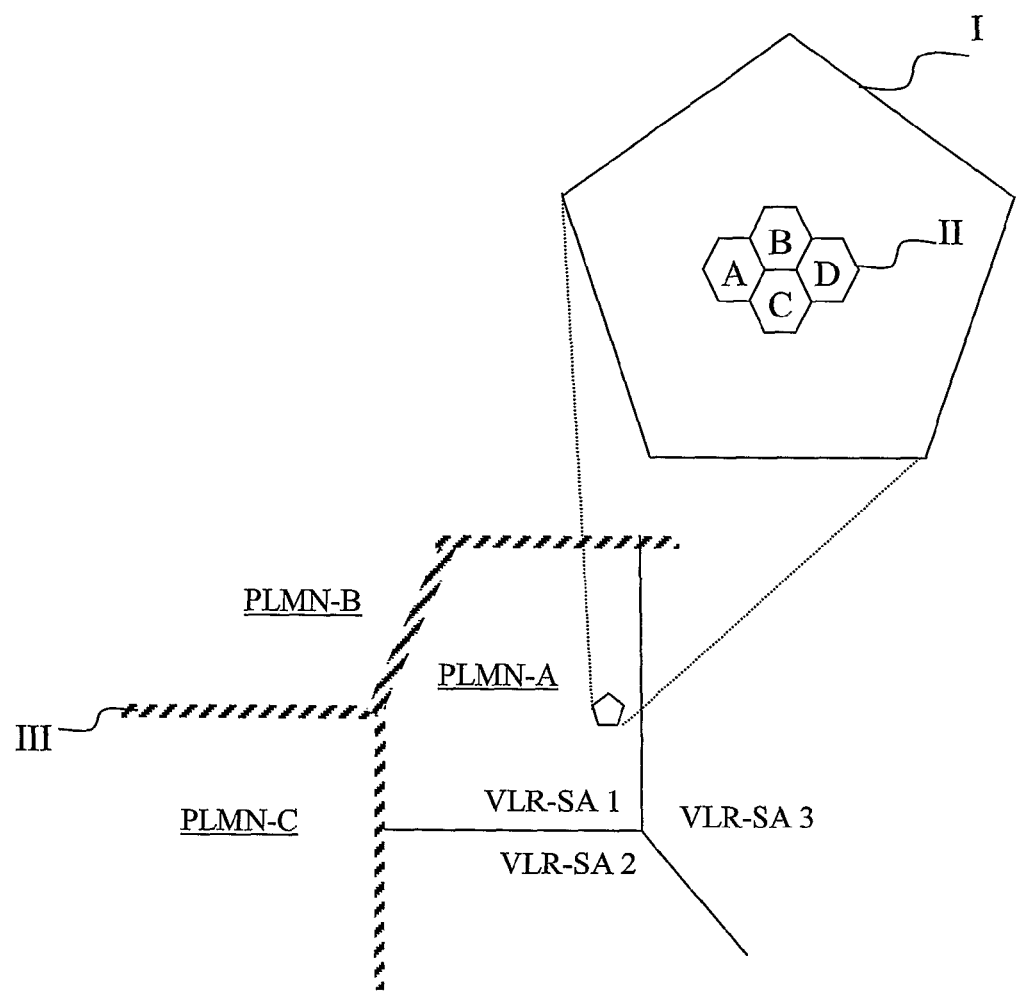
FIG. 1 shows a schematic diagram of geographical area relations of PLMNs.

FIG. 1 shows geographical relations between PLMNs VLR-SAs, LSAs and Zones. Two PLMNs of a same type, e.g. GSM, have only a small border area (III) in common. A mobile station can access both PLMNs when it is present in the border area else it can only access one of the PLMNs. If PLMNs are not of a same type, e.g. GSM and UMTS, PLMNs may wholly or partly overlap each other. A geographical area of a PLMN is divided amongst one or more VLR-SAs. Inside the geographical area of a VLR-SA one or more LSAs (I) reside. Inside an LSA (I) one or more zones (II) reside, comprising the geographical area covered by cells (A, B, C, and D).

A mobile station is registered in one or more PLMNs as a home PLMN. In other PLMNs it will be registered as a visitor when it resides inside the geographical area of that PLMN. Zones can only be defined in a PLMN when it is a home PLMN for the mobile station or in a visiting PLMN when owned by the same operator as the home PLMN.

Figure 2:
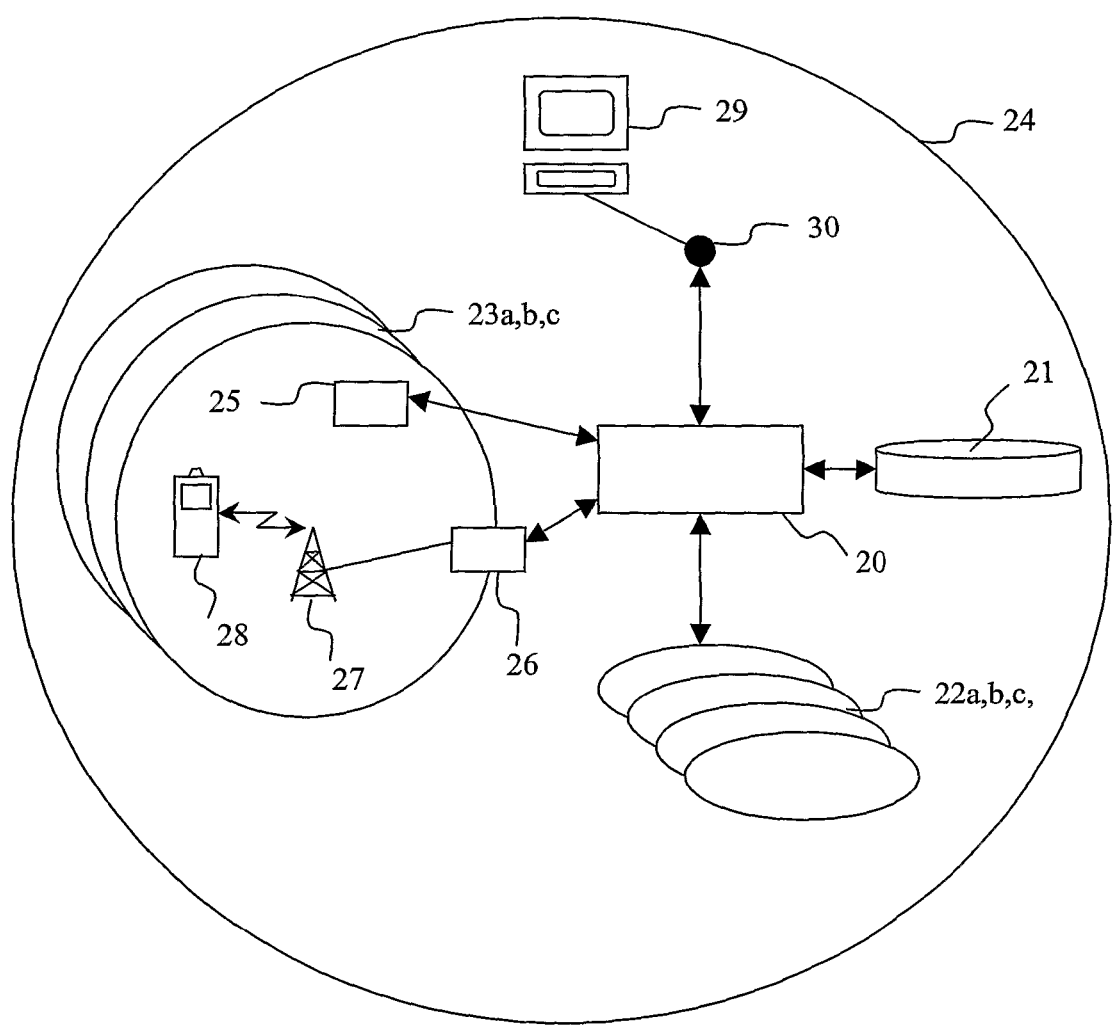
FIG. 2 shows a schematic diagram of communications system including the present invention.

FIG. 2 shows a communication system comprising one or more PLMNs (23a, 23b, 23c). The communication further comprises a zone server (20), connected to a zone database (21). The zone server is connected to the administrative function (25) in each PLMN. For GSM or UMTS type of PLMNs the administrative function is designated as HLR (Home Location Register). The zone server is also connected to mobile stations (28) via access points (27) and gateway (26). Both connections provide the zone server with information in which geographical area a mobile station resides. The zone database contains one record for each defined zone per PLMN per IMSI of a mobile station. Each record maintains a state of presence of the mobile station in the defined zone.

The zone server is also connected to facility and services executing functions (22a, 22b, 22c, 22d). These can query the zone server for actual presence in a zone or presence in any zone of a specific mobile station specified by its IMSI. Additionally they can start or stop a subscription to changes in the presence state of a specific combination of zone, PLMN and IMSI.

The zone server has also a connection to a terminal (29) for editing, deleting or creating new zone records in the zone database. The terminal is operationally connected to the communication systems via one of the communications systems access points (30). The communication systems transport network establishes connection between access point and zone server.

An advantage of the Zone Server according to the invention is that it can serve multiple PLMNs. An operator having multiple PLMNs therefore can handle zones in all of them with a single Zone server and Zone Database.

Also advantageously the zone server according to the invention notifies a user of a mobile terminal on presence of the mobile terminal in a zone.

The zone server according to the invention may provide zone enforcement. Zone enforcement is required when a mobile terminal is in the border area or overlap area of two different PLMNs. A first PLMN is home PLMN of the mobile terminal and contains a zone located inside the overlap or border area. When the mobile terminal currently resides in a second PLMN in which it is a visitor then when entering the zone no switchover will occur to the home PLMN as the connection to the visitor PLMN will maintain. The advantage of the zone server according to the present invention is that it automatically enforces a mobile terminal to the home PLMN so it is registered as being present in the zone.

Zone Database.

Figure 4:
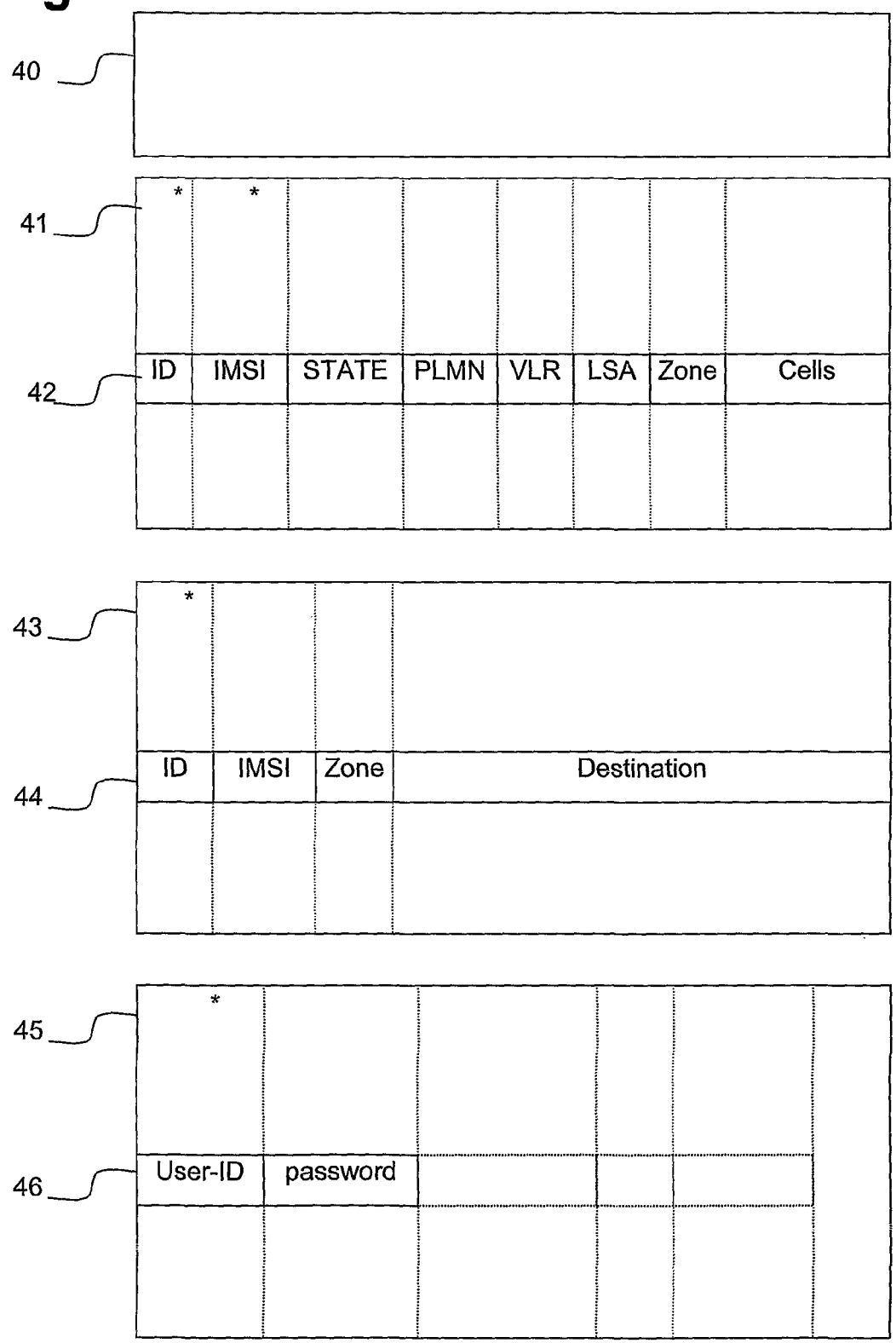
FIG. 4 shows a schematic diagram of data stored in a zone database.

The Zone Server (20) uses the zone database (21) for storing administrative and operational data. Data stored is divided in 4 groups. Content of the zone database is outlined in FIG. 4.

First group is the general administrative data (40) used for start-up of the zone server.

A second group is a zone table (41) with zone records (42). Zone record fields comprise: ID (Zone record identification), IMSI (mobile station identification, STATE (State of presence), PLMN (Home PLMN in which the zone resides), VLR (VLR-SA in which the zone resides), LSA (LSA in which the zone resides), Zone (Name of the zone as displayed on user terminal), Cells (list of cells that build-up the zone).

Having a unique ID for a zone gives the advantage of creating several zones of a same type for a user, e.g. multiple office zones. The STATE field can have values: OUT (current location of mobile station is outside the home PLMN for that zone), PLMN (mobile station resides in the home PLMN for that Zone but not yet in a VLR-SA containing that zone), VLR (mobile station resides in the VLR-SA containing that zone but not yet in the LSA containing that zone), LSA (mobile station resides in the LSA containing that zone but not yet in the actual zone itself), Zone (mobile station resides in that zone). The fields PLMN, VLR and LSA contain the actual PLMN, VLR and LSA in which the zone resides. Advantageously the identity of PLMN, VLR and LSA can be replaced by the destination address of the administrative function responsible e.g. PLMN=destination address of HLR.

For zone enforcement a shadow record of a zone record exists in the zone table. The shadow record has the same fields as the zone record. The contents is however slightly different. The LSA field is empty as the shadow zone is defined in a visiting PLMN. The mobility function might not be present and if present it might not be accessible as it belongs to another operator. The PLMN field does not contain the HLR address but instead a VLR address specifying a VLR-SA in the visiting network. Therefore PLMN and VLR-SA field contain the same value. The VLR address of the VLR-SA where the mobile station is present is maintained in the HLR of the mobile terminal.

As the zone table is very frequently accessed it is dual indexed on both ID and IMSI field. This gives the advantage of faster access, as those fields are the only two used for direct referencing.

A third group is a subscription table (43) that keeps one subscription record (44) for each service or facility that subscribes to notification of entrance or exit of an IMSI in a Zone. The subscription record comprises the ID of the zone and destination details of the subscribing service or facility.

A fourth group is a table (45) with authentication records (46). Each record specifies details on a terminal with maintenance access. This includes at least a user identity with a password for entrance, but can be extended with items like a certificate for a unique terminal granted access for maintenance.

As an option the zone server or its separate functions can have a local cache memory, which is at start-up read from the zone database and updated in parallel with updates to the zone database. This option has the advantage that read performance increases and requirements for access speed of the zone database are kept in limits.

Figure 3:
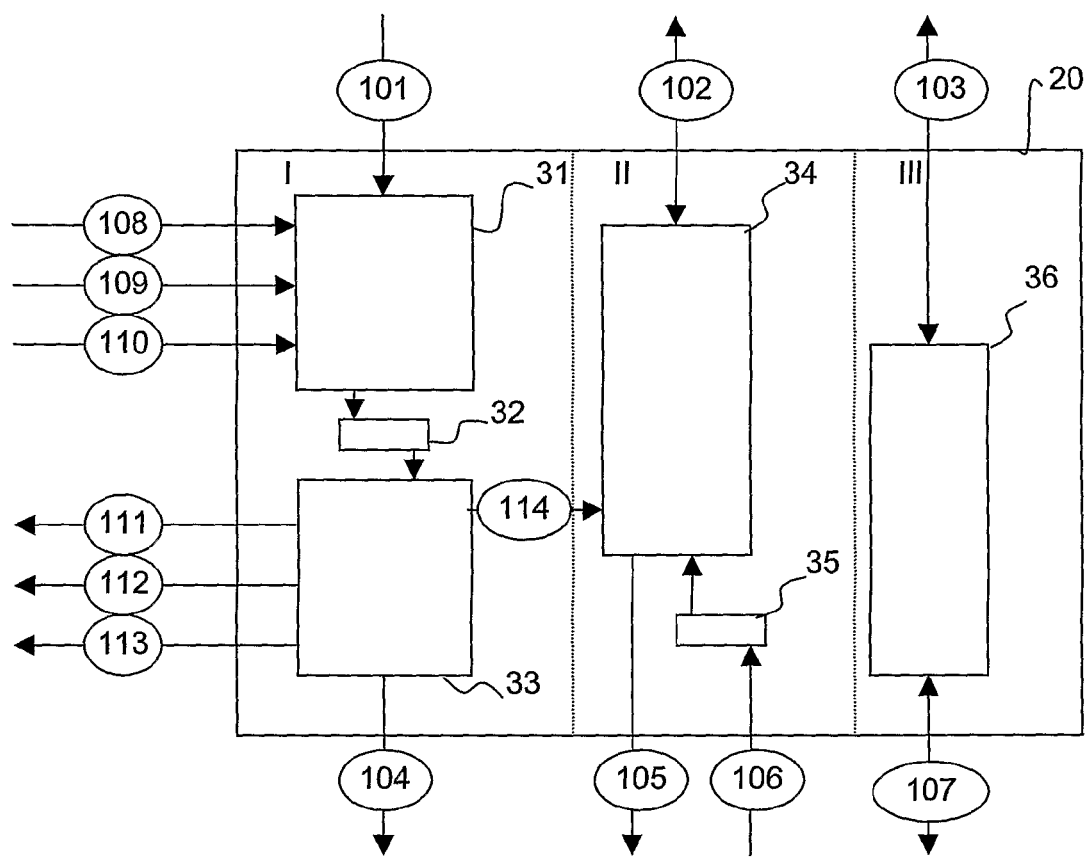
FIG. 3 shows a schematic diagram of a zone server.

FIG. 3 shows a zone server in detail. The zone server consists of 3 sections (I, II, III). Section 1 (I) keeps track of mobile stations presence in geographically areas. Section 2 (II) handles the requests from facilities and services for presence information. Section 3 (III) handles maintenance access for new, editing or deleting zone definitions.

Section 1 comprises a comparator (31), an intermediate FIFO (32) and a zone state sequencer (33). The comparator receives current geographical area messages and change of geographical area messages for mobile stations. Messages, related to current or change of PLMN or VLR-SA, are received from the HLR via connection (108). Messages, related to current or change of LSA, are received from the mobility management function in the HLR via connection (109). Messages, related to current or changed cell, are received from the mobile stations. Each message comprises an IMSI of a mobile station and a type and value of a geographical area the mobile station is present or has moved into.

For each received message the comparator retrieves zone records from the zone database where the IMSI matches. The retrieval and processing of multiple matches allows both adjacent zones and multiple PLMN handling as well as zone enforcement.

The comparator modifies each zone record and writes it into the intermediate FIFO. The modification comprises the replacement of the cell list of the zone record with a geographical area field (containing 'PLMN', 'VLR', 'LSA' or 'Zone') and a match field (containing '=' or '≠'). The geographical area field gets the value of the type of geographical area as stated in the received message. The match field gets a value based on comparison of the value of the geographical area as stated in the message with a value in one of the geographical area fields in the zone record having the same type as the type of geographical area as stated in the received message. The comparator has an additional feature to include the current state when two fields have the same value. If PLMN and VLR-SA have the same value then the comparator takes the PLMN field for comparison when the state field contains OUT. The comparator takes the VLR-SA field when the current state field contains PLMN or VLR. This feature facilitates zone enforcement.

The zone state sequencer (33) executes a hierarchical area method for tracking presence of mobile stations in geographical areas. This method has the advantage that it further lowers the load on administrative functions in the mobile networks. The core of the method is that a subscription to an administrative function or node for change in geographical area is only made when the mobile station moves into a higher order geographical area. As example: the subscription for change in LSA for a certain mobile station is only made when the mobile station moves into the VLR-SA containing a zone. When the mobile station leaves the VLR-SA containing the zone, the subscription is stopped.

Additional advantage is derived by the boundary handling method. When a zone, LSA or VLR-SA type of area is on the boundary of a PLMN the mobile station may move not only into the PLMN but also simultaneously into a lower type of geographical area. The boundary handling method therefore requests the current value of the first lower type of area when the mobile stations moves into the higher order type of area. As example: when the mobile station moves into a home PLMN a request for a current VLR-SA is done.

Both methods are also advantageous at start-up of the zone server. In this case an initialization routine makes initial HLR subscriptions for change of PLMN/VLR and requests for current PLMN/VLR, for every IMSI for which a zone record is present in the zone database.

The zone state sequencer reads modified zone records from the intermediate FIFO. It uses the contents of the state field and the LSA field in the modified zone record as input together with the geographical area field and match field determined by the comparator. The content of the state field determines a current state and the three other fields determine to what next state to go to. The state sequencer executes before entering a next state one or more of the possible routines. These routines can provide messages, which are forwarded via connections (111, 112 and 113). As multiple zone records are processed for a single IMSI also multiple messages for that IMSI may be generated. The state sequencer therefore temporarily stores message to the same IMSI until a message for another IMSI is to be transmitted. The messages are aligned to provide a right order, e.g. inactivation messages are transmitted first (like when leaving a zone) and then the activation message (simultaneously entering an other zone in the same LSA).

Figure 5:
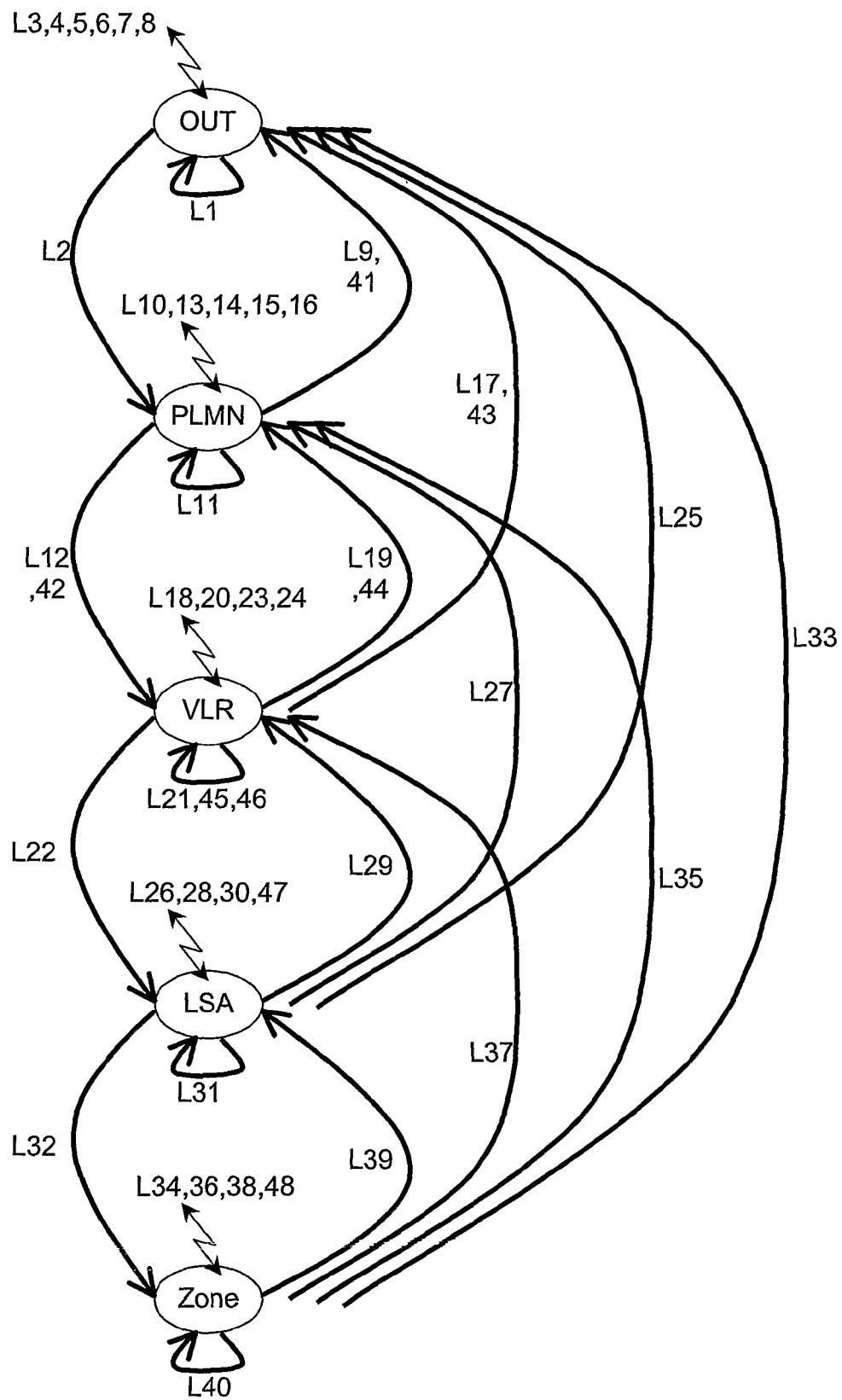
FIG. 5 shows a state diagram of a zone state sequencer.

The state sequencer writes (104), after execution of the routines, the next state back in the zone record in the zone database indicated by the ID in the modified zone record. State changes are visualised in FIG. 5. Line numbers in FIG. 5 correspond with Table 1 stated hereafter, which include routines executed for a certain change of state.

TABLE 1

Zone state sequencer table: (X = don't care)

| Line | Cur. State | Condition | LSA | Actions | Next state |
|---|---|---|---|---|---|
| 1 | OUT | new PLMN ≠ Zone PLMN | X | no actions | OUT |
| 2 | OUT | new PLMN = Zone PLMN | X | Request current VLR activate MS application | PLMN |
| 3 | OUT | new VLR ≠ Zone VLR | X | Execute error routine | OUT |
| 4 | OUT | new VLR = Zone VLR | X | Execute error routine | OUT |
| 5 | OUT | new LSA ≠ Zone LSA | X | Execute error routine | OUT |
| 6 | OUT | new LSA = Zone LSA | X | Execute error routine | OUT |
| 7 | OUT | new cell ≠ Zone cell | X | Execute error routine | OUT |
| 8 | OUT | new cell = Zone cell | X | Execute error routine | OUT |
| 9 | PLMN | new PLMN ≠ Zone PLMN | X | Inactivate MS application | OUT |
| 10 | PLMN | new PLMN = Zone PLMN | X | Execute error routine | PLMN |
| 11 | PLMN | new VLR ≠ Zone VLR | >0 | no actions | PLMN |
| 41 | PLMN | new VLR ≠ Zone VLR | =0 | Inactivate MS application | OUT |
| 12 | PLMN | new VLR = Zone VLR | >0 | Request current LSA Subscribe for LSA changes | VLR |
| 42 | PLMN | new VLR = Zone VLR | =0 | MS application to cell alarm mode | VLR |
| 13 | PLMN | new LSA ≠ Zone LSA | X | Execute error routine | PLMN |
| 14 | PLMN | new LSA = Zone LSA | X | Execute error routine | PLMN |
| 15 | PLMN | new cell ≠ Zone cell | X | Execute error routine | PLMN |
| 16 | PLMN | new cell = Zone cell | X | Execute error routine | PLMN |
| 17 | VLR | new PLMN ≠ Zone PLMN | >0 | Un-subscribe for LSA changes | OUT |
| 43 | VLR | new PLMN ≠ Zone PLMN | =0 | "Inactivate MS application | OUT |
| 18 | VLR | new PLMN = Zone PLMN | X | Execute error routine | VLR |
| 19 | VLR | new VLR ≠ Zone VLR | >0 | No actions | PLMN |
| 44 | VLR | new VLR ≠ Zone VLR | =0 | MS application to standby mode Request current VLR | PLMN |
| 20 | VLR | new VLR = Zone VLR | >0 | Execute error routine | VLR |
| 21 | VLR | new LSA ≠ Zone LSA | X | no actions | VLR |
| 22 | VLR | new LSA = Zone LSA | X | MS application to cell update mode | LSA |
| 23 | VLR | new cell ≠ Zone cell | >0 | Execute error routine | VLR |
| 24 | VLR | new cell = Zone cell | >0 | Execute error routine | VLR |
| 45 | VLR | new cell ≠ Zone cell | =0 | no action | VLR |
| 46 | VLR | new cell = Zone cell | =0 | MS push network | VLR |
| 25 | LSA | new PLMN ≠ Zone PLMN | >0 | Un-subscribe for LSA changes MS application to standby mode | OUT |
| 26 | LSA | new PLMN = Zone PLMN | >0 | Execute error routine | LSA |
| 27 | LSA | new VLR ≠ Zone VLR | >0 | Un-subscribe for LSA changes MS application to standby mode | PLMN |
| 28 | LSA | new VLR = Zone VLR | >0 | Execute error routine | LSA |
| 29 | LSA | new LSA ≠ Zone LSA | >0 | MS application to standby mode | VLR |
| 30 | LSA | new LSA = Zone LSA | >0 | Execute error routine | LSA |
| 31 | LSA | new cell ≠ Zone cell | >0 | no actions | LSA |
| 32 | LSA | new cell = Zone cell | >0 | Notification to MS user S3/S4 change to request handler | ZONE |
| 47 | LSA | X | =0 | Error routine | VLR |
| 33 | ZONE | new PLMN ≠ Zone PLMN | >0 | Un-subscribe for LSA changes MS application to standby mode S3/S4 change to request handler | OUT |
| 34 | ZONE | new PLMN = Zone PLMN | >0 | Execute error routine | ZONE |
| 35 | ZONE | new VLR ≠ Zone VLR | >0 | Un-subscribe for LSA changes MS application to standby mode S3/S4 change to request handler | PLMN |
| 36 | ZONE | new VLR = Zone VLR | >0 | Execute error routine | ZONE |
| 37 | ZONE | new LSA ≠ Zone LSA | >0 | MS application to standby mode S3/S4 change to request handler | VLR |
| 38 | ZONE | new LSA = Zone LSA | >0 | Execute error routine | ZONE |
| 39 | ZONE | new cell ≠ Zone cell | >0 | S3/S4 change to request handler Notification to MS user | LSA |
| 40 | ZONE | new cell = Zone cell | >0 | no actions | ZONE |
| 48 | ZONE | X | =0 | Error routine | VLR |

Routines mentioned in Table 1 are described hereafter in some more detail.

No Action.

No action is basically not a routine but only an indication in the state table not to act. This includes no write back of a next state to the zone record too. Request current VLR-SA. This routine writes a message requesting current VLR-SA for a specified IMSI (Mobile Station) via connection (111) to the HLR. The request is made when a mobile station enters a home PLMN. Purpose of this routine is to handle situations where a mobile station not only enters the home PLMN but also simultaneously a VLR-SA containing a Zone. A subscription to changes of VLR-SA would not work, as this would indicate only a move out of the VLR-SA entered simultaneously when entering the home PLMN. The IMSI is retrieved from the modified zone record.

Request Current LSA.

This routine writes a message requesting current LSA for a specified IMSI (Mobile Station) via connection (112) to the mobility management function in the HLR. The request is made when a mobile station enters a VLR-SA containing a defined zone for that mobile station. Purpose of this routine is to handle situations where a mobile station not only enters the VLR-SA containing a defined zone but also simultaneously a LSA containing a zone. A subscription to changes of LSA would not work, as this would indicate only a move out of the LSA entered simultaneously when entering the VLR-SA containing a defined zone. The IMSI is retrieved from the modified zone record.

Subscribe to LSA Changes.

This routine sends a message, for subscribing to changes of LSA for an IMSI (mobile station), to the mobility management function in the HLR via connection (112). The IMSI is retrieved from the modified zone record. This message is only generated when a mobile station moves into a VLR-SA containing a defined zone for that mobile station. Purpose of this routine is to get changes in LSA of a mobile station to determine whether it moves into or out of a LSA containing a defined zone for that mobile station.

Unsubscribe to LSA Changes.

This routine sends a message to the mobility management function in the HLR via connection (112) for stopping a subscription to changes of LSA, when a mobile station moves out of a VLR-SA containing a defined zone for that mobile station. The message comprises an IMSI as specification of a mobile station for which the subscription needs to be stopped. Purpose of this routine is to reduce load of the HLR, as LSA changes are not needed as long as the mobile station is not in the VLR-SA containing a defined zone for that mobile station. The IMSI is retrieved from the modified zone record.

Activate Mobile Station Application.

This routine handles an interactive sequence of messages in which the current version of the mobile station application is checked, a new version is loaded when current does not exist or is not appropriate for the PLMN the mobile station is in, and changing the state of the mobile station application to standby mode once operational. The message sequence is started, when a mobile station enters a PLMN. All messages are forwarded via interface (113).

Inactivate Mobile Station Application.

This message is sent when a mobile station leaves a PLMN. The message is sent via interface (113) and cause the mobile station application to go to the inactive state.

Mobile Station Application to Cell Change Mode.

This routine sends a message via connection (113) to start notification on change of cell or change of access point in which the mobile station has access. Purpose of this routine is to check whether a mobile station moves into or out of one of the cells belonging to a defined zone. The message comprises an IMSI of a mobile station as specified in the modified zone record.

Mobile Station Application to Cell Alarm Mode.

This routine sends a message via connection (113) to switch from standby mode to cell alarm mode. Cell alarm mode causes the mobile station to check if a current cell or access point matches one identified in the string contained in the message. The message comprises also an IMSI of a mobile station as specified in the modified zone record.

Mobile Station Application to Standby Mode.

This routine sends a message via connection (113) to switch to the standby state, stopping either call alarm mode or cell change mode. Purpose of this routine is to lower the load in a radio network as the cell change notifications are only needed when a mobile station resides in a LSA containing a defined zone for that mobile station. The message comprises an IMSI of a mobile station as specified in the modified zone record.

Notify MS User.

This routine sends a notification message (M7) via connection (113) trough a gateway (26) to a mobile station. When the current state is LSA the message comprises a zone name and an IMSI of a mobile station as specified in the modified zone record. The mobile station will show the zone name on the display as notification to the user that he is in that zone. When the current state is Zone the message send comprises an indication to remove the zone name from the display.

Mobile Station Push Network.

This routine sends a message via connection (113) to switch to another network identified in the message. The message comprises the name of the network to connect to and an IMSI of a mobile station as specified in the modified zone record.

3-4 state changes to request handler. Signal LSA to Zone and Zone to LSA state changes to request handler.

This routine is executed when a mobile station enters into or moves out of a defined zone. The zone state sequencer sends an ID/state pair to a request handler in section 2. The ID is a copy of the ID field in the zone record. The state is the current state as specified in the modified zone record.

Error Routine.

The error routine is executed for two basic situations. First situation is receiving a change of geographical area message on a hierarchical lower layer when the mobile is not yet in a correct hierarchical higher layer geographical area. An example of this situation is receiving a VLR-SA change message when the mobile station is not in the home PLMN. As these messages would only occur when subscribed to, for some reasons a subscription is not stopped properly. The error routine therefore sends again an applicable stop message (VLR-SA, LSA or cell change) as described before.

A second situation is that a change to a geographical area message is received while current state says that the mobile station is already in that area. Example: receiving a change message for moving into a VLR-SA while the mobile station is already in that VLR-SA. There can be several reasons why. One possibility is that the mobile station was switched off or temporarily out of reach while leaving the geographical area and now re-enters that area. Other possibility can be that a get current geographical area messages is received later than a subscription to change of geographical area by an administrative function. In the second situation no further actions are taken by the error routine.

Optionally error logging can be done to the zone database for later analysis.

Section 2 comprises a request handler (34) and an input FIFO (35). Incoming requests from services and facilities via connection (106) are intermediate stored in the input FIFO (35). The request handler reads the incoming requests from the input FIFO and processes them one by one. Any reply is sent back to the requesting service or facility via connection (105). The request handler has a connection (102) to the zone database for reading and writing subscriptions records to the subscription table and reading zone records from the zone table. The request handler also receives (114) zone record ID/state pairs from the state sequencer (33) where a state change has occurred from 'LSA' to 'Zone' or 'Zone' to 'LSA'. The request handler runs a single process for handling requests, which is interrupted by received ID/state pairs.

A request has a standard format comprising following fields: IMSI, Zone, Subscription and destination. IMSI, Zone and subscription field may be left blank. The subscription field can have value 'start' or 'stop'. The zone field contains a zone name. The destination field contains the destination to which replies shall be sent. The types of request depends on fields left blank as depicted in Table 2.

TABLE 2

| IMSI | Zone | Subscribe | Request |
| --- | --- | --- | --- |
| Blank | Blank | Blank | No request |
| Blank | Blank | START | Not allowed |
| Blank | Blank | STOP | Stop all subscriptions for requesting facility or service |
| Blank | Name | Blank | Check presence of any IMSI in a zone |
| Blank | Name | START | Start subscription entry/exit of any IMSI in a zone |
| Blank | Name | STOP | Stop subscription entry/exit of any IMSI in a zone |
| Nr | Blank | Blank | Check presence of an IMSI in any zone |
| Nr | Blank | START | Start subscription entry/exit of an IMSI in any zone |
| Nr | Blank | STOP | Stop subscription entry/exit of an IMSI in any zone |
| Nr | Name | Blank | Check presence of an IMSI in a zone |
| Nr | Name | START | Start subscription entry/exit of an IMSI in a zone |
| Nr | Name | STOP | Stop subscription entry/exit of an IMSI in a zone |

Figure 6:
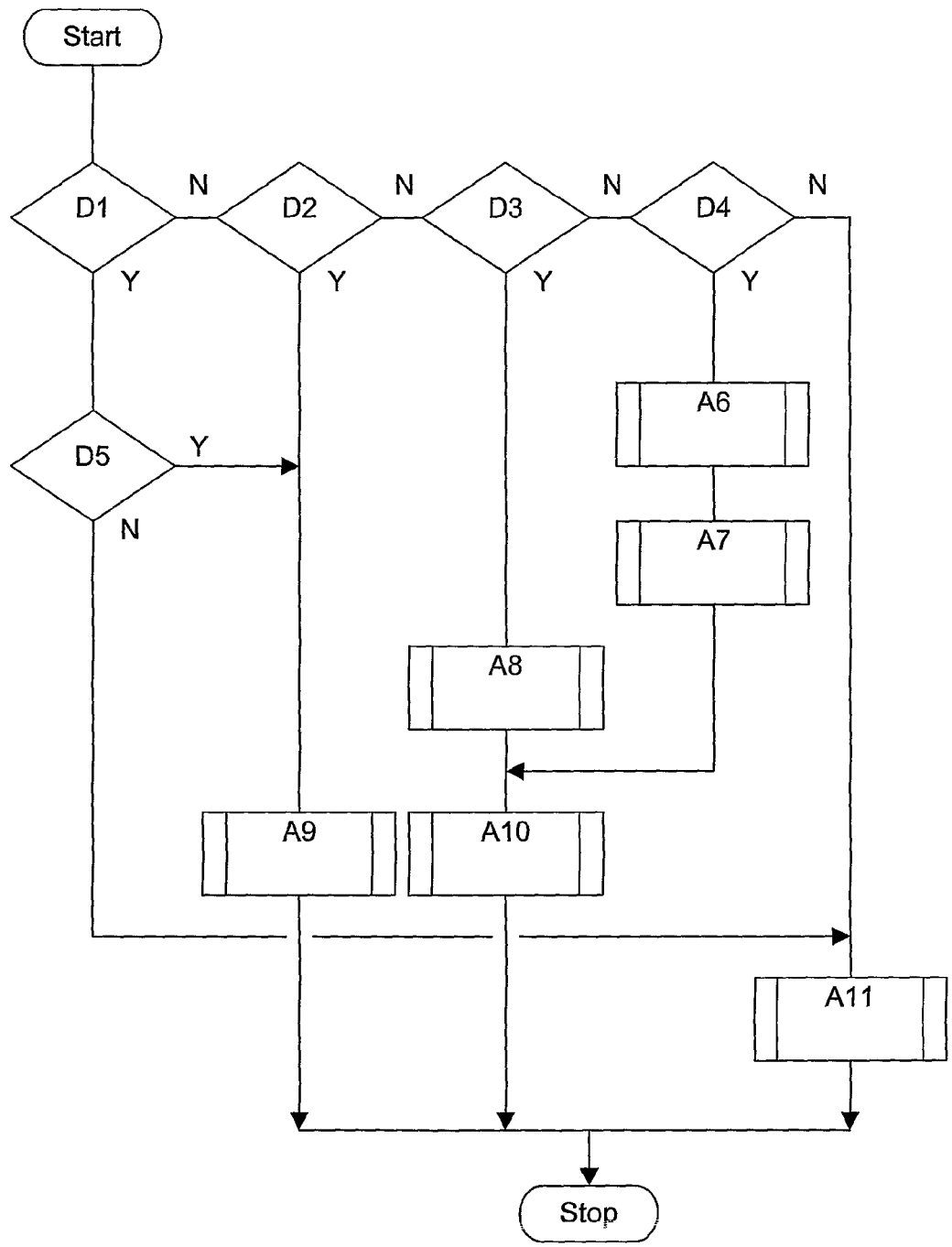
FIG. 6 shows a flow diagram of a request handling process in a zone server.

The process of handling a request is shown in FIG. 6. After fetching a next request from a requesting service or facility from the input FIFO, the request handler performs a first check (D1) whether both IMSI and Zone field in the request are blank.

If so, the request handler continues with a second check (D5) whether the subscribe field in the request contains 'stop'. If not, it continues with activity (A11), sending an error message back to the requesting service or facility that the request was not valid. After this activity handling of the request is completed and the process is started for a next request from the input FIFO.

If the result of the second check (D2) was 'yes', then the request handler executes activity (A9) in which all subscription records in the subscription table, matching IMSI, Zone and destination, are deleted. As both IMSI and Zone fields are blank effectively this means that every matching destination field causes the subscription record to be deleted. After that, handling is completed and the process is started for a next request from the input FIFO.

If the result of the first check was 'no' then again a check is performed whether the subscribe field in the request contains 'stop'. If so, then the request handler continues with activity (A9) in which it deletes all subscription matching IMSI, Zone and destination. If either IMSI or Zone is blank any subscription record matching the other fields is deleted. After activity (A9), handling is completed and the process is started for a next request from the input FIFO.

If the checks (D1) and (D2) where both 'no' then a check (D3) is done, checking if the subscribe field in the request is left blank. If so, activity (A8) is executed reading from the Zone table all zone records matching IMSI and Zone value of the fields in the request. In activity (A10) for each record received an answer is prepared and sent to the requesting service or facility. Each answer contains IMSI, Zone as stated in the zone record as well as an indicator having value inside when the state field has the value 'zone' or outside if it has any other value. The answers are sent to the destination as stated in the request. After handling is completed, the process is started for a next request from the input FIFO.

If the checks (D1) (D2) and (D3) where all 'no' then a check (D4) is done, checking if the subscribe field in the request contains 'start'. If also not then activity (A11) is executed in which an error message is sent back to the requesting service or facility that the request was not valid. After this activity handling of the request is completed and the process is started for a next request from the input FIFO.

If the result of check (D4) was 'yes' then activity (A6) is executed comparable to activity (A8) as described before. Then activity (A7) is executed in which for each received zone record a subscription record is created. ID, IMSI and zone field value are copied from the zone record in the subscription record. The destination field value is copied from the request. The subscription table does not allow multiple entries having same ID, IMSI, Zone and destination value. In that case the subscription record is overwritten. After activity (A7) activity (A10) is executed as described before. This provides requesting services and facilities direct with an initial value for the presence of a mobile station in a certain zone. After sending a message for each zone record, handling of the request is completed and the process is started for a next request from the input FIFO.

The request handling process is interrupted when an ID/State pair is received from the zone state sequencer via connection (114). The zone sequencer sends an ID/State pair when a state change from 'Zone' to 'LSA' or 'LSA' to 'Zone' occurred. The State in the ID/State pair is the current state When an ID/State pair is received, the request handler interrupts its request handling process and starts a subscription routine. The ID in the ID/State pair is compared to the ID field of each subscription record. Where ever a match is found the request handler prepares a message with IMSI, zone and 'entrance' or 'exit'. IMSI and zone are copied from the subscription record. Entrance or exit is determined on the state in the ID/State pair. If the state is 'Zone' then it is 'exit', if it is 'LSA' then 'entrance'. The message is sent to the destination as in the destination field of the subscription record. When all subscription records are checked the subscription routine ends and the request handling process continues.

A person skilled in the art may appreciate that other embodiments of section 2 are possible in which presence and change of presence is extended to higher order geographical areas.

Section 3 comprises a maintenance handler (36) connected (103) to the zone database and connected (107) to one or more maintenance terminals via the transport network of the communication system. An operator wanting to maintain zones first requests connection to the maintenance handler. The maintenance handler starts a login procedure in which user identity and a password are requested. Upon reception from the operator, the maintenance handler retrieves the record identified by the user identity from the zone database from the table with authentication records. The maintenance handler checks password provided with password stored in the authentication record. Optionally it also checks terminal identity and or terminal destination address. If all complies access is granted.

The operator can then select either change of password or editing zone definitions.

When requesting editing zone definitions, the operator as a user is prompted to enter an IMSI on which the maintenance handler reads in the zone database from the zone table all records with matching IMSI. This list is provided to the user that can select one zone definition form the list to delete, to edit or not selecting any and create a new zone definition. The maintenance handler verifies the user entry and performs the required updates in the zone table. In case the user deletes a zone definition the maintenance handler checks also the subscription table. If a subscription was made for that zone definition that subscription is deleted too. When the user enters a new zone definition the maintenance handler checks if any other zone definition is present for that IMSI. If not then the maintenance handler performs the initial subscription towards the HLR for change messages when changes of PLMN/VLR occur. The maintenance handler also requests the HLR to send the current PLMN/VLR the mobile station resides.

In case of multiple users allowed to maintain only specific sets of IMSIs an optional check on IMSI can be included. Therefore an additional table comprising records with User identity and IMSI pairs is contained in the zone database. When a user enters an IMSI, first the optional check is performed, by verifying that a record with user identity and IMSI is present in the additional table. This is especially advantageous if different providers make use of a single zone server of an operator.

Another option is to automatically generate shadow zones. Based on a list of overlapping access points and cells automatically a shadow zone record is created with the creation of a zone record.

Mobile Station Application.

The zone server communicates with a zone application in mobile terminals. This communication takes place via a gateway (26) to a PLMN (23*a* to *c*) in which the mobile terminal is present, and an access point (27). The communication uses state of the art data transport mechanisms, available for a type of PLMN, like USSD, SMS-0, OTA or SIP. The zone application it self is also transported using the same data transport mechanisms. A user of a mobile terminal does therefore not have to load and install the zone application but the zone server does this fully automatically. This has an additional advantage that the zone server is in control of the version of the zone application and that the zone server can update the zone application when needed.

The zone server activates the zone application in each terminal, known in the zone server by its IMSI, when it is switched on inside or enters a coverage area of a PLMN. When leaving a PLMN the zone server inactivates the zone application again. This procedure is also applied in case of multiple PLMN coverage of the zone server and for visiting PLMNs with shadow zones. This has a special advantage as it allows different application versions for different PLMNs.

Figure 9:
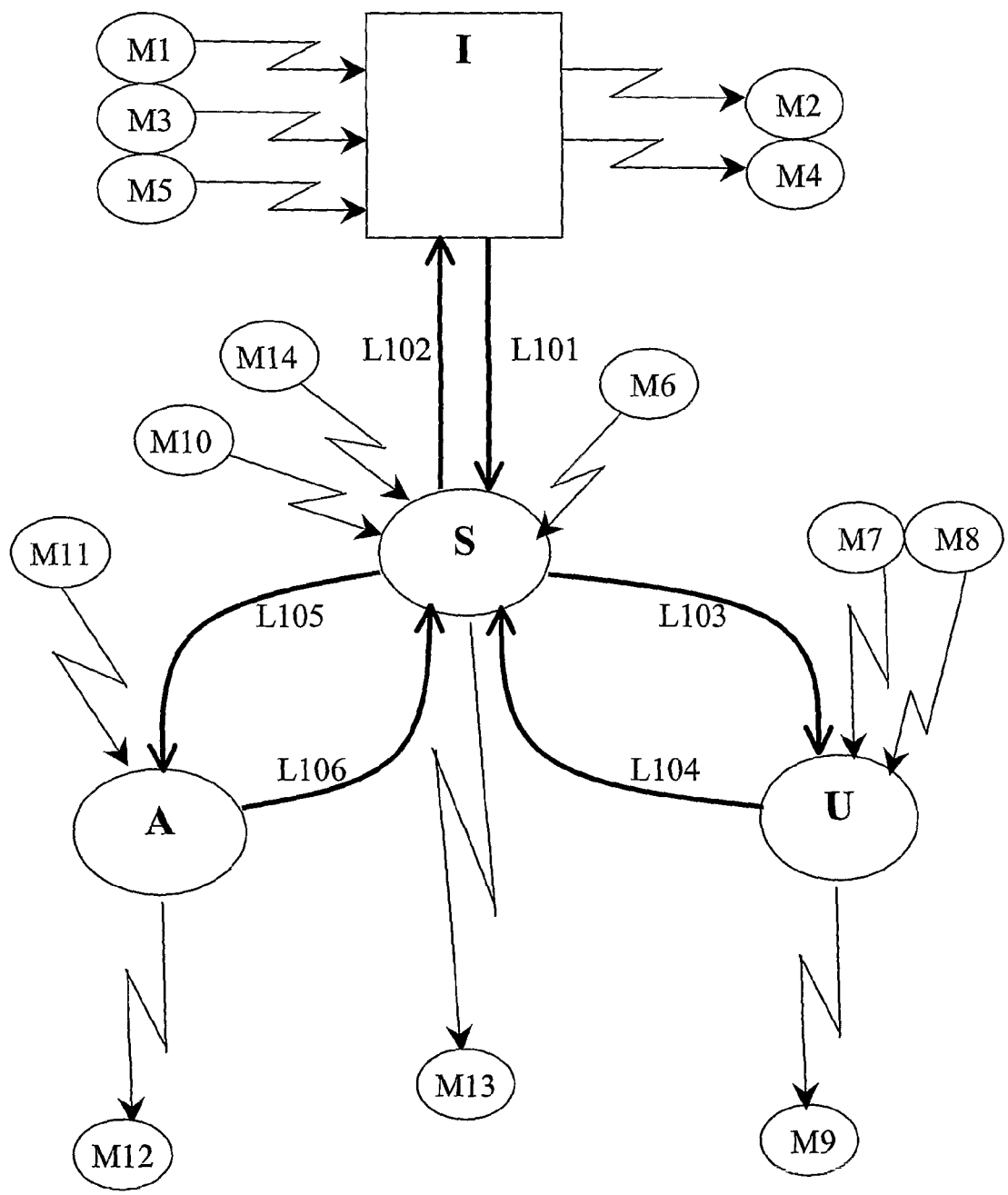
FIG. 9 shows the state diagram of a zone application in a mobile station.

FIG. 9 describes the zone application in its different states and the messages it accepts and generates in these states. When the zone application is resident in the mobile terminal but is inactive it is in the Inactive state (I). When switching on the mobile terminal inside a PLMN covered by the zone server a version check message (M1) is sent to the mobile terminal. The mobile terminal replies with a version messages (M2) stating the version of the zone application resident in the mobile terminal. If the version is correct, for the PLMN the mobile terminal resides in, then the zone server sends an activation message (M5). Upon receipt the zone application changes (L101) from the inactive to a Standby state (S). When no zone application is resident in the mobile terminal or it is not a correct version then the zone server sends a package message (M3) that contains a correct version of the zone application. The package is self-installing and generates a ready message (M4) when installation is completed. Upon receiving the ready message the zone server sends the activation message. Installing a version includes removal of other versions of the zone application.

The zone application activated has 3 different modes of operation. A standby state (S), a cell update state (U) and a cell alarm state (A). The zone server orders change of state by sending specific messages to the zone application. When the zone application is in the standby state and a change to cell update message (M6) is received, the zone application changes (L103) to the cell update state (U). With a change to standby mode message (M8) the zone application returns (L104) to the standby state. In the cell update state the zone application sends a cell change message (M9) each time it moves into another cell or changes from access point. The message includes the identification of the access point connected to now or the cell moved into. The zone server can send a notification message (M7), when the zone application is in the cell update state that will change an operator/network text on the display of the mobile terminal. The zone server can so indicate to the user of the mobile terminal that the mobile terminal is in or connected in a zone so the user is notified that now certain facilities are available. Same message can be used to notify the user that he has left a zone.

When the mobile terminal is in the standby state after entering a visiting PLMN that has a shadow zone of a zone in a home PLMN, the zone server can send a change to cell alarm mode message (M10). The zone application changes (L105) to the cell alarm state (A). The change to cell alarm mode message contains a string of identifications of access points or cells in the visiting PLMN. In the cell alarm state the zone application will generate a cell match message (M12) if an identity of an access point connected to or a cell the mobile terminal resides in, matches one mentioned in the string of identifications of access points or cells. The cell match message contains the identity of the matching cell or access point.

Based on a received cell match message, the zone server can send a push network message (M11). The zone application will take care that the mobile terminal changes connection to a correct network as indicated. If the connection to the correct network is established the zone application automatically changes (L106) back to the standby state.

When the mobile terminal leaves a certain PLMN the zone server inactivates the zone application with sending an inactivate message (M14) causing the zone application to inactivate (L102).

Figure 7:
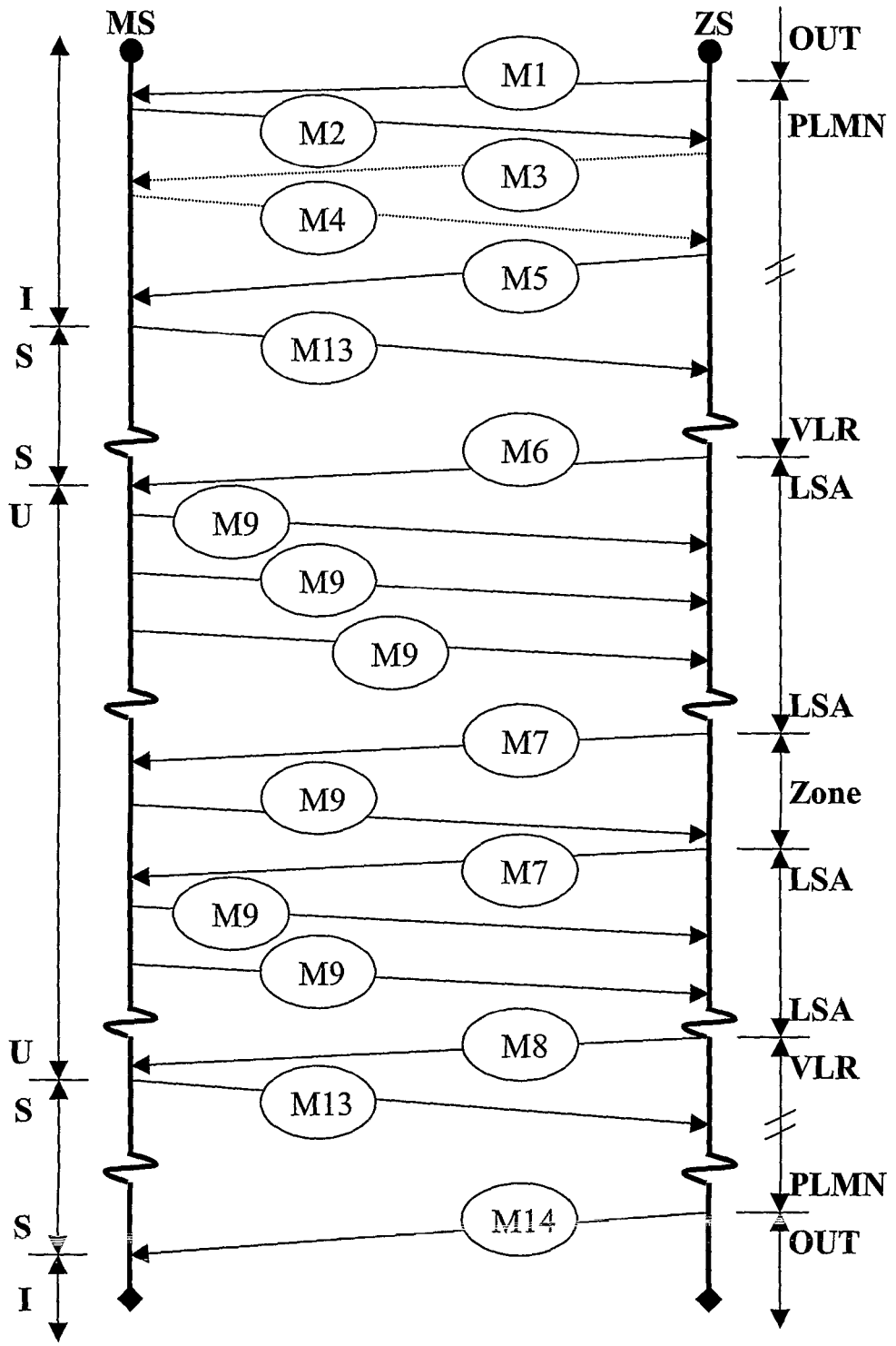
FIG. 7 shows the schematic flow of messages between zone server and mobile station for a zone in a home PLMN.

FIG. 7 describes interaction between zone server and zone application for a case where the mobile terminal switches on in or enters a PLMN containing a defined zone, passes trough this zone and subsequently leaves the PLMN again.

When switched off or not present in the PLMN containing the zone the status field of the zone record is OUT. The zone application is inactive or not yet present in the mobile terminal. When the mobile terminal switches on or enters the PLMN, which is notified by the administrative function in the PLMN to the zone server, the zone server sends the version check message (M1) and changes the state field of the zone record to PLMN. Based on the received version messages (M2) the zone server either sends directly the activation message (M5) or it first sends the package message (M3) and waits for receiving the ready message (M4) from the zone application. After receiving the activation message the zone application switches to the standby state.

The zone application maintains the standby state till the mobile terminal moves into a Location Support Area (LSA) containing a zone. The zone server gets the notification from the mobility function in the PLMN administrative function. It sends a change to cell update mode message (M6) to the zone application and sets the states of the zone to LSA. The zone application changes to the cell update state. It now starts to send cell change message (M9) to the zone server. If the identification in a cell change message matches on of the cells of a zone, the zone server sets the zone states field to Zone and sends a notification message (M7) to the zone application notifying the user of the presence in the zone. In the meantime the zone application continues to send cell change messages. As long as they all match with the zone definition the zone state remains Zone.

When a first cell change message is received by the zone server not matching the zone definition the zone server sends again a notification messages notifying the user he has left the zone. The zone state changes to LSA again. The zone application continues to send cell update messages until the zone server receives notification from the mobility function in the PLMN administrative function that the mobile terminal has left the LSA. The zone server sends a change to standby mode message (M8) to the zone application and sets the zone state to VLR. The zone application changes upon receipt of the message to the standby state and notifies this with a standby message (M13) to the zone server. If the terminal finally moves out of a PLMN coverage area this is notified to the zone server by the administrative function of that PLMN. The zone server acts by sending an inactivate message (M14) to the zone application that changes to the inactive state without further notification.

Figure 8:
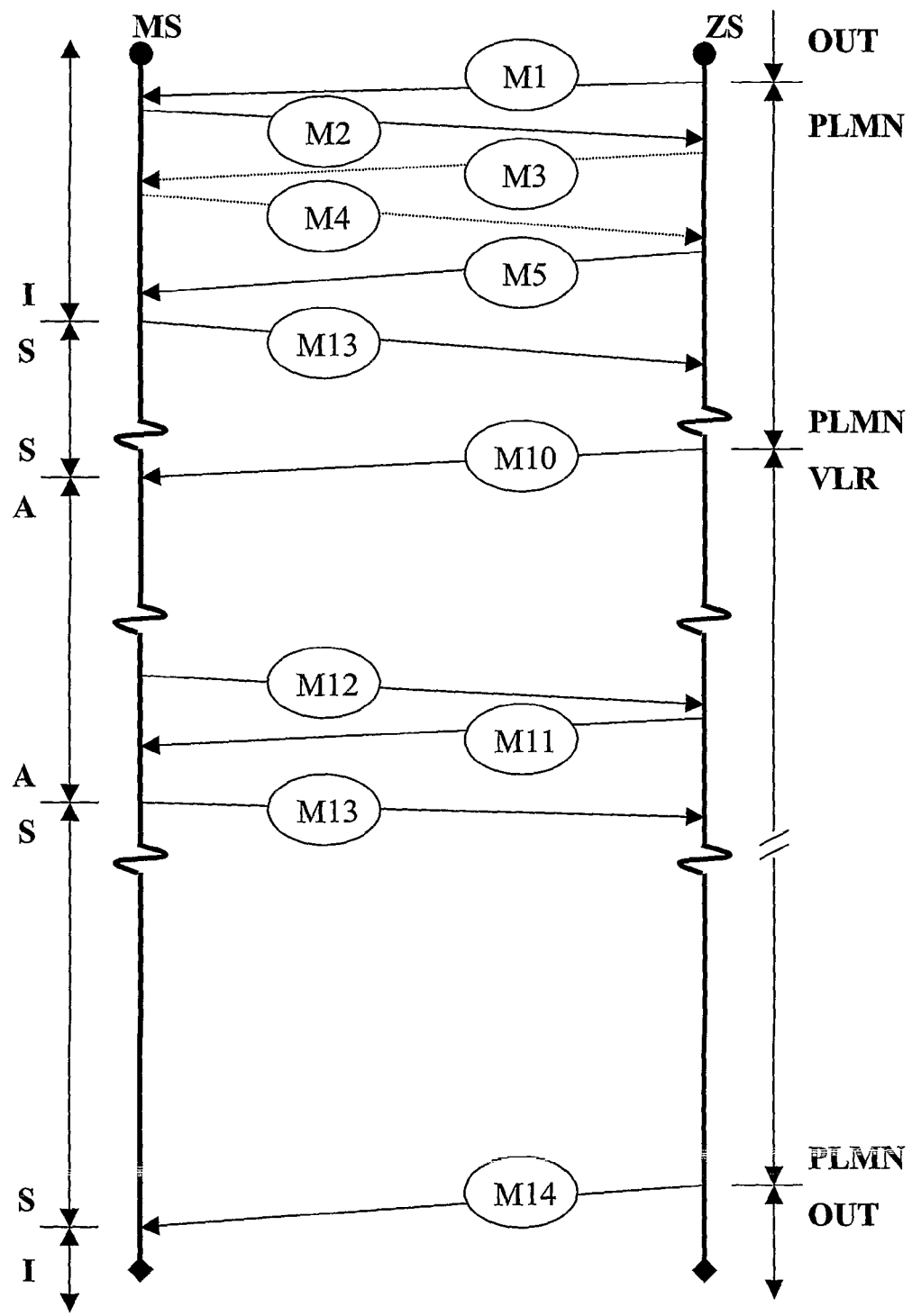
FIG. 8 shows the schematic flow of messages between zone server and mobile station for a shadow zone in a visiting PLMN.

FIG. 8 describes a different case where a mobile terminal enters a visiting PLMN containing a shadow zone and moves into the shadow zone.

When entering the visiting PLMN basic actions are the same as described for the previous case. Version is checked and adapted if required and the zone server orders the zone application to become active and go to the standby state. The zone application acknowledges with the standby message (M13).

The zone application remains in the standby state till the terminal enters the VLR containing the shadow zone. The zone server is notified of such by the administrative functions in a home PLMN of the mobile terminal. The zone server now sends a change to cell alarm mode message with the identifications of access points and cells making up the shadow zone. The state of the shadow zone record becomes VLR.

The zone application changes to cell alarm state. In this state the zone application continuously checks if a match exists. If so a cell alarm message (M12) is sent to the zone server. The zone server sends a push network message (M11) to the zone application containing the identification of the network containing the real zone. The zone application takes care of the change to the other network. If switched over the zone application sends a standby message (M13) to the zone server and switches it state to standby. By connecting to the other network the mobile terminal factually enters the PLMN containing the real zone. Handling for this zone record goes as described before case.

Effect of change to another PLMN also means that the zone server is notified of this and sends the inactivation message (M14) to the zone application that so switches to the inactive state. The status of the shadow zone record becomes OUT.

The embodiments described for the present invention, are a possible way of implementing the invention, enabling a person skilled in the art to appreciate the teachings.

The invention claimed is:

1. A method of providing at least one dedicated service to a mobile station by a mobile telecommunication system, the mobile telecommunication system comprising at least one mobile telecommunication network, each of the at least one mobile telecommunication network comprising a plurality of higher order geographical service areas fit for providing service to the mobile station, wherein at least one of the plurality of higher order geographical service area comprises at least one lower order geographical service area fit for providing service to the mobile station, a dedicated service area residing in a higher order geographical service area and residing in a lower order geographical service area, the method comprising monitoring whether the mobile station receives service from a higher order geographical service area;
determining presence of a dedicated service area in said higher order geographical service area on detecting the mobile station receiving service from said the higher order geographical service area,
monitoring whether the mobile station receives service from a lower order geographical service area on establishing presence of the dedicated service area in the current higher order geographical service area;
determining presence of a dedicated service area in said lower order geographical service area on detecting the mobile station receiving service from said lower order geographical service area;
triggering the mobile station to provide location information on establishing presence of a dedicated service area in said lower order geographical service area;
providing location information by the mobile station after triggering the mobile station to provide location information;
monitoring presence of the mobile station in a dedicated service area based on the location information provided by the mobile station; and
providing said at least one dedicated service to the mobile station on detecting presence of the mobile station in said dedicated service area.

2. The method according to claim 1, further comprising the step of:
determining a lower order geographical service area from which the mobile station receives service on detecting the mobile station receiving service from said higher order geographical service area.

3. The method according claim 2, further comprising
establishing absence of a dedicated service area in a higher order geographical service area on detecting the mobile station receiving service from a higher order geographical service area; and
triggering the mobile station to stop providing location information.

4. The method according to claim 1, further comprising the steps of:
detecting presence of the mobile station in an alternative dedicated service area residing in an alternative overlapping higher order geographical service area on establishing presence of the mobile station in a dedicated service area based on the location information provided by the mobile station; and communicating to the mobile station an identity of said alternative higher order geographical service area, changing service by the mobile station to said alternative higher order geographical service area; and providing an alternative dedicated service to the mobile station.

5. The method according to claim 1, wherein the step of establishing presence of the mobile station in a dedicated service area based on the location information provided by the mobile station comprises comparing the location information from the mobile station with previously stored location information relating to a dedicated service area.

6. The method according to claim 1, wherein said at least one telecommunication network comprising a plurality of cells from which the mobile station receives service and the dedicated service area comprises at least one cell.

7. The method according to claim 6, wherein the step of providing location information after triggering the mobile station to provide location information relates to providing an identification of a cell from which the mobile station receives service.

8. The method according to claim 7, wherein the step of providing location information after triggering the mobile station to provide location information comprises providing an identification of a cell from which the mobile station receives service on changing of the mobile station to another cell.

9. The method according to claim 1, indicating to a user of said presence of said mobile station in a dedicated service area.

10. The method according to claim 9, wherein the step of indicating to a user of said presence of said mobile station in the dedicated service area comprises at least one of:

displaying a name of a telecommunication network wherein said dedicated service area resides on a display of said mobile station;

displaying a dedicated icon on a display of said mobile station; and providing a dedicated audio alert by said mobile station.

11. The method according to claim 1, wherein the plurality of higher order service areas comprise at least one Public Land Mobile Network at least one of which is a home Public land Mobile Network of the mobile station, and at least one Visiting Location Register Service Area, and wherein the step of monitoring whether the mobile station receives service from a new higher order geographical service area comprises' registering to a Home Location Register administrative function of the at least one home Public Land Mobile Network of the mobile station to receive change notification on the mobile station receiving service from a Public Land Mobile Network or a Visiting Location Register Service Area; and receiving change notification from the administrative function of the home Public Land Mobile Network of the mobile station indicating the Public Land Mobile Network or a Visiting Location Register Service Area providing service to the mobile station.

12. The method according to claim 11, wherein a lower order geographical service area may comprise a Location Service Area and wherein the step of monitoring whether the mobile station receives service from a lower order geographical service area comprises:

registering to a Home Location Register mobility function of the home Public Land Mobile Network of the mobile station to receive change notification on the mobile station receiving service from a Location Service Area; and receiving change notification from the mobility function of the home Public Land Mobile Network indicating the Location Service Area providing service to the mobile station.

13. The method according to claim 1, further comprising the steps of:

verifying presence of an up-to-date computer application program comprising computer executable instructions for providing location information, in the mobile station on detecting the mobile station receiving service from a higher order geographical service area; and downloading the up-to-date computer application program for providing location information to the mobile station and installing the up-to-date computer application program in the mobile station on detecting absence of an up-to-date computer application program for providing location information in the mobile station.

14. An apparatus for providing a dedicated service to a mobile station, by a mobile telecommunication system, the mobile telecommunication system comprising at least one mobile telecommunication network, each of the at least one mobile telecommunication network comprising a plurality of higher order geographical service areas fit for providing service to the mobile station, wherein at least one of the plurality of higher order geographical service area comprises at least one lower order geographical service area for providing service to the mobile station, a dedicated service area residing in a higher order geographical service area and residing in a lower order geographical service area, the apparatus comprising:

means for monitoring whether the mobile station receives service from a higher order geographical service area;

means for determining presence of a dedicated service area in said higher order geographical service area on detecting the mobile station receiving service from said the higher order geographical service area, means for monitoring whether the mobile station receives service from a lower order geographical service area on establishing presence of the dedicated service area in the current higher order geographical service area;

means for determining presence of a dedicated service area in said lower order geographical service area on detecting the mobile station receiving service from said lower order geographical service area;

means for triggering the mobile station to provide location information on establishing presence of a dedicated service area in said lower order geographical service area;

means for providing location information by the mobile station after triggering the mobile station to provide location information;

means for monitoring presence of the mobile station in a dedicated service area based on the location information provided by the mobile station; and means for providing said at least one dedicated service to the mobile station on detecting presence of the mobile station in said dedicated service area.

* * * * *

UNITED STATES PATENT AND TRADEMARK OFFICE
CERTIFICATE OF CORRECTION

PATENT NO.        : 8,208,940 B2
APPLICATION NO.   : 12/095712
DATED             : June 26, 2012
INVENTOR(S)       : Noldus et al.

Page 1 of 1

It is certified that error appears in the above-identified patent and that said Letters Patent is hereby corrected as shown below:

In Column 12, Line 23, delete "trough" and insert -- through --, therefor.

In Column 14, Line 42, delete "state" and insert -- state. --, therefor.

In Column 16, Line 58, delete "trough" and insert -- through --, therefor.

In Column 18, Lines 19-20, in Claim 1, delete "comprising" and insert -- comprising: --, therefor.

In Column 18, Line 26, in Claim 1, delete "area," and insert -- area; --, therefor.

In Column 18, Line 53, in Claim 3, delete "according claim 2, further comprising" and insert -- according to claim 2, further comprising: --, therefor.

In Column 19, Line 2, in Claim 4, delete "area," and insert -- area; --, therefor.

In Column 19, Line 43, in Claim 11, delete "land" and insert -- Land --, therefor.

In Column 19, Line 46, in Claim 11, delete "comprises'" and insert -- comprises: --, therefor.

In Column 20, Line 40, in Claim 14, delete "area," and insert -- area; --, therefor.

Signed and Sealed this
Sixteenth Day of October, 2012

David J. Kappos
*Director of the United States Patent and Trademark Office*